United States Patent [19]

Tamminen

[11] 4,060,670
[45] Nov. 29, 1977

[54] ALKALINE FLAT CELL BATTERY

[76] Inventor: Pentti Juuse Tamminen, Otsolahdentie 6, 02100 Tapiola, Finland

[21] Appl. No.: 413,288

[22] Filed: Nov. 6, 1973

[30] Foreign Application Priority Data

Nov. 10, 1972 Finland .................................. 723151

[51] Int. Cl.² ............................................. H01M 2/30
[52] U.S. Cl. .................................... 429/154; 429/159; 429/162; 429/178
[58] Field of Search ............... 136/107, 110, 111, 135; 429/154, 159, 162, 178

[56] References Cited

U.S. PATENT DOCUMENTS

| 1,920,151 | 7/1933 | Ruben | 136/111 X |
| 2,649,492 | 8/1953 | Linton et al. | 136/111 |
| 2,745,894 | 5/1956 | Nowotny | 136/111 |
| 2,798,895 | 7/1957 | Nowotny | 136/111 |
| 3,278,339 | 10/1966 | Reilly et al. | 136/107 |

Primary Examiner—Winston A. Douglas
Assistant Examiner—John F. Niebling
Attorney, Agent, or Firm—Ladas, Parry, Von Gehr, Goldsmith & Deschamps

[57] ABSTRACT

A hermetically sealed flat cell with an alkaline electrolyte and a battery made out of a number of such cells. Both the positive and the negative electrode layer of each cell of the battery is provided with a supporting plate preferably covering the whole outside of respective layer. Said plate incorporates a current collector, the outside of each current collector being provided at the contact area with a relatively thick, plastic and sticky layer of chemically inert, water repellent adhesive. Each cell is covered with a plastics sheet that is preferably laminated and comprises two layers, the inside layer of which is chemically resistant and heat sealable, the outside layer being mechanically tough and resistant to oxygen transmission. Enclosing of each cell has been carried out by means of heat sealing in a vacuum. When assembling a battery, there is provided at said adhesive layer on both sides of each cell a contact member consisting of a preferably spiral-shaped pressure spring with sharp edges facing opposite directions, adapted to pierce said plastic cover, the pitch of said spring allowing under pressure ample latitude of elastic movement so as to secure a firm electrical contact of said edges to the current collectors within each cell.

17 Claims, 14 Drawing Figures

ALKALINE FLAT CELL BATTERY

This invention relates to hermetically sealed flat cells with an alkaline electrolyte and to a battery made therefrom.

According to U.S. Pat. No. 2,798,895 there is described a cell construction in which the active parts of the cell: a zinc plate acting as negative electrode, electrolyte-containing separator, depolarizing mix cake, and a rigid positive electrode of carbon are hermetically sealed in an envelope of plastics sheet material, the inside of which is coated with an adhesive layer. These cells are connected together to form a battery by placing between them point contact plates comprising projections in opposite directions from the plane of the plates. Contacts to and between the cells are effected by subjecting the stack of cells to compression so as to puncture the envelopes by means of the projections of the contact plates.

The construction described in the said U.S. Pat. No. 2,798,895 is adapted for Leclanché type cells in which the positive electrode layer is comparatively hard and rigid as well as the negative electrode, which is made of solid zinc. If this construction is used in cells with an alkaline electrolyte, the electrolyte, in spite of the adhesive, tends to gradually ooze along the zinc surface, finally reaching the contact point whereby the electrical connection is cut off. Further, in alkaline flat cells, in order to secure optimum performance the amount of electrolyte that is needed makes the active layers pasty. In fact, it is feasible to make the electrode layers by extrusion method. In order to secure a good contact, the referred construction calls for such a compression of the battery stack that it would cause deformation of the pasty electrode layers, whereby the pressure of the contact points against the electrodes is reduced and the electrical contacts may even be cut off. The point contact plate limits the penetration of the contact projections into the cell essentially deeper than enough to pierce the covering foil, that is not sufficient to maintain the contact if a deformation of the electrode layers takes place. In addition, it has been found that the polyethylene sheet suggested in the above patent for alkaline cells has not proved satisfactory for this purpose because of its high oxygen transmission rate. During storage the atmospheric oxygen gradually destroys the negative electrode.

According to the present invention, the active components of the current-producing cell are sealed to an envelope of plastic foil that preferably comprises at least two layers laminated together, the layer facing the inside of the envelope being chemically inert and heat sealable such as polyethylene, and the other layer being mechanically strong and substantially impervious to oxygen gas and consisting of, e.g., polyamide. This laminated foil is adapted to prevent the escape of water vapour from the cell and the oxygen penetration into the cell, but its hydrogen transmission rate is sufficient to prevent the formation of hydrogen pressure inside the cell.

In order to obtain the necessary rigidity of the cells that makes possible to compress a stack of cells to form a battery according to the present invention, the active components of each cell are heat sealed within an envelope of said laminated plastic foil in a vacuum. Because of the atmospheric pressure, even the pasty layers within the sealed cells will be rigid and can be compressed against each other without deformation taking place. However, if later the vacuum inside the cell envelope would be reduced, e.g., because of gas formation due to impurities, these pasty layers may yield and special means are necessary to secure the contact between and to the cells. Therefore, the main object of the present invention is to secure the contact between and to the cells with maximum reliability while applying minimum compression when grouping the cells and end plates to form a battery, at the same time making sure that any leakage of electrolyte from the cells is prevented.

Another object of this invention is to provide a simplified cell construction that is adapted to automatic and cheap production process.

Said objects of this invention are mainly accomplished by providing both the positive and the negative electrode layer of each cell of the battery with a supporting plate preferably covering the whole outside of respective layer, said plate incorporating a current collector, by providing the outside of each current collector at the contact area with a relatively thick, plastic layer of chemically inert, water repellent adhesive, covering each cell with a plastic sheet that is preferably laminated and comprises two layers, the inside layer of which is chemically resistant and heat sealable, the outside layer being mechanically tough and resistant to oxygen transmission, enclosing each cell with said plastic cover by heat sealing in a vacuum, and when assembling a battery, providing at said adhesive layer on both sides of each cell a contact member consisting of a preferably spirally shaped pressure spring with sharp edges facing opposite directions and adapted to pierce said plastic cover, the pitch of said spring under pressure allowing ample latitude of elastic movement so as to secure a firm electrical contact of said edges to the current collectors within each cell.

An important feature of this invention is the negative current collector which preferably comprises a plastic plate on which the adhesive layer sticks firmly so that the alkaline electrolyte cannot ooze into a contact plate which, on the outside, is fully covered by a relatively thick and soft layer of said insulating adhesive. The positive current collector is preferably of iron and is preferably on the side facing the depolarizing mix covered by a carbon loaded conductive paint in which the binder material is very resistant to oxygen, such as chlorosulfonated polyethylene. At a place on the outside of said iron current collector corresponding to the contact plate of the negative electrode, when the cells are stacked upon each other, there is a similar layer of insulating adhesive covering a limited area of the current collector. Said conductive paint has been found to improve very much the function of the cell especially when it is used as a storage battery. As indicated, e.g., in the book: Falk-Salkind: "Alkaline Storage Batteries," pages 369-370, an alkaline manganese battery can be recharged at least 50 times. Without this protective conductive paint the iron current collector would be oxidized which would considerably reduce the number of effective cycles at the rechargeable use of this battery. The reason why said adhesive insulating layers are relatively thick is that when the contact springs are placed between the cells and at the ends of a cell stack forming a battery and the elements are compressed together, the contact springs will be actually embedded within the yielding adhesive layers that positively prevent any leakage of the electrolyte from each cell. At the same time, because of the pitch of the spring contact and pointed contact edges on which practically the whole compression force is concentrated, a very reliable and effective continously elastic electrical contact between and to each current collector plate is permanently secured.

This novel cell construction comprising said combinations of current collector and contact plates together with externally applied contact springs as well as the production method including a vacuum packing method of the cells assist to make the production cheap and very automatic. When using a vacuum packing machinery as illustrated in FIG. 9, it is preferable to have a thicker foil underneath and by means of heat and vacuum to form in its cups in which the parts of the cells are stacked. In this case it is possible to add electrolyte into each of these cups before they are finally sealed by the upper foil in a vacuum. By this method cells with excellent discharge characteristics containing a high proportion of electrolyte can be manufactured and yet, after heat sealing, because of the atmospheric pressure outside the cells, they can be easily handled and grouped to batteries without deformation taking place.

Reference is made to the attached drawings in which.

Figure 9:
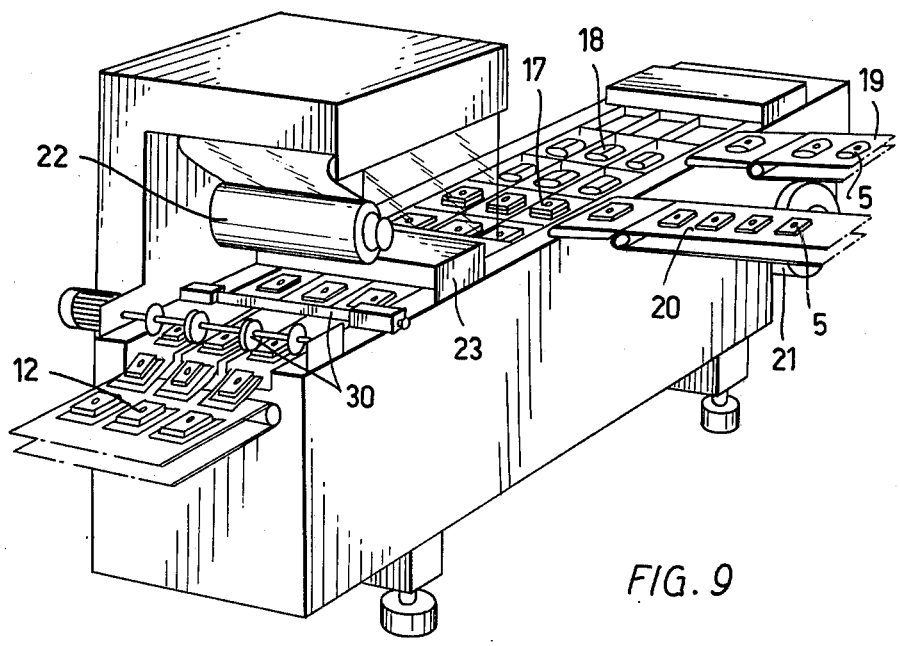

FIG. 9 schematically illustrates a process for the production of cell units.

Figure 1:
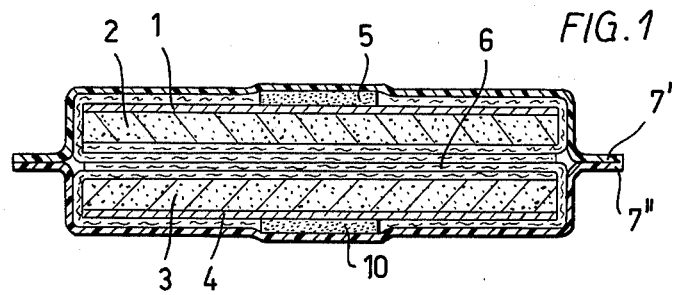
FIG. 1 illustrates the cross-section of one embodiment of the cell unit according to the invention.

In FIG. 1, the steel sheet 1 is a positive current collector. Its under-surface is preferably covered with a paint made conductive by means of graphite and carbon black and having a binding material resistant to the electrolyte used, in the present case. KOH-solution of about 30 percent. The positive electrode is a mix cake 2 compressed from carbon and manganesedioxyde-powder and moistened with electrolyte. The negative electrode 3 contains amalgamated zinc powder and, e.g., glue-like electrolyte made by means of carboxymethylcellulose. The negative current collector 4 can be, e.g., a steel sheet which has been treated, e.g., in a KOH-solution together with excessively amalgamated zinc powder so that no hydrogen evolution takes place on its surface in the circumstances prevailing within the cell unit. In the middle of the outer surface of each current collector sheet 1 and 4 there is a sticky insulating layer 5 and 10 formed, e.g., by means of a circular tool resembling a die. Bitumen, softened, e.g., with oil, is one suitable insulating material for this purpose. Each electrode with its current collector is separately packed in a separator paper 6 in which there is, at the place of the insulating layer (5, 10) a hole of about the same size as said layer. The electrode elements, disposed against each other, are packed in a plastics envelope 7 by heat sealing preferably in vacuum whereby the plastics envelope is tightly compressed around the galvanic cell formed and against the insulating layers 5 and 10. The cell unit thus obtained is fully closed and surrounded by the insulating material, whereby it can easily be handled and stored nearly in any kind of conditions, even under water, without any appearance of short circuit currents which could result in destroying the galvanic element of the cell unit.

Figure 2:
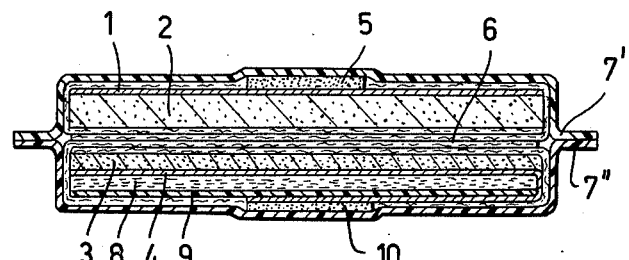
FIG. 2 illustrates the cross-section of another embodiment of the cell unit according to the invention.
Figure 3A:
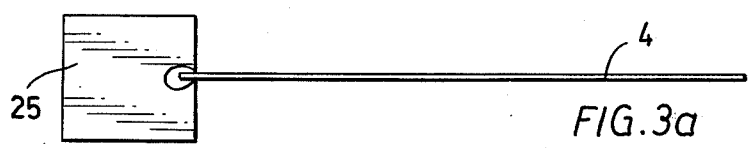
FIGS. 3a and 3b illustrate two embodiments of the current collector of the cell unit according to FIG. 2.

FIG. 2 illustrates a modification of the cell unit which is particularly suitable for batteries with a large capacity. As to these, an additional electrolyte reserve is required in connection with the negative electrode in order to utilize the zinc effectively. The positive electrode element is of the same kind as in FIG. 1. A copper wire 4, separately illustrated in FIG. 3a, and a metal sheet 25 soldered or welded thereon function as the negative current collector. According to a preferred embodiment of FIG. 3b, the current collector 25 comprises a circular copper or steel plate and a copper wire.

A polystyrene sheet 9 gives the necessary stiffness to the electrode. The sheet 25 is wholly immessed in melted insulating mixture when hanging on the wire 4, whereafter it is disposed in the middle of the polystyrene sheet 9 so that it sticks to it firmly. On the inside surface of the sheet 9 an electrolyte layer 8, such as absorbent paper soaked with a KOH-solution is applied, upon which the current collector wire 4 is bent. Upon this there is a layer of zinc powder electrode 3, and the packing in separator papers 6 and vacuum sealing in a plastics envelope 7', and 7" together with the positive electrode package is carried out as stated in connection with FIG. 1.

According to the invention, batteries are made of two different kinds of parts: cell units and contact elements. The spiral springs 11 comprising nearly a whole circle, illustrated in FIG. 4, which is made, e.g., of steel wire and the pitch of which being about a half of the diameter, has proved to be reliable and practical contact element. It is also simple and cheap.

Figure 4A:
FIGS. 4a and 4d illustrate two embodiments of the contact member according to the invention in two projections.
Figure 4B:
Figure 4C:
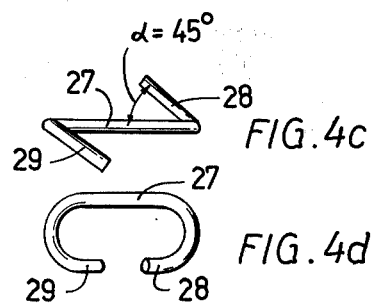
Figure 4D:
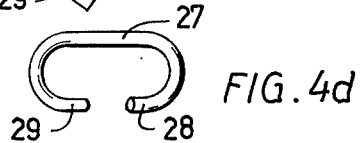

A still better contact element is shown in FIGS. 4c and 4d in an enlarged scale. Said element comprises a substantially straight portion 27 and two curved point portions 28 and 29 facing in substantially opposite directions, the angle $\alpha$ between said curved point portions 28 and 29 and the main plane of the element being preferably in the order of 45°.

Figure 5:
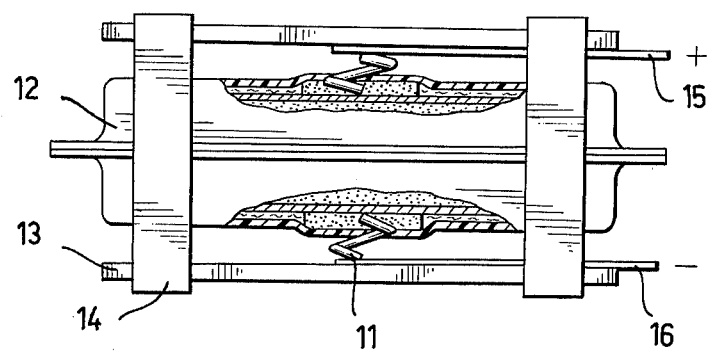
FIG. 5 illustrates a partial section of a battery comprising one cell unit.

FIG. 5 schematically illustrates a battery comprising a cell 12, contact elements 11, end plates 13 which may be, e.g., of stiff plastics or cardboard, bands 14 which may be, e.g., rubber rings, and metallic contact strips 15 and 16 which form the positive and negative poles of the battery. In practice, the end plates are compressed into contact with the surface of the cell unit, and a non-elastic band, e.g., of polypropylene, is disposed at the site of the contact springs. In small batteries end plates 13 may be omitted. The elastic contact elements thus keep the cell unit under a sufficient pressure in order to make sure its effective functioning and firm electric contact. The contact element is compressed through the plastics, envelope of the cell at a point where the insulating layer (5, 10) occupies the space between the plastics envelope and the corresponding current collector whereby the electrolyte of the cell cannot leak out at the piercing point. The insultion can further be secured by immersing the contact elements in melted insulating material before assembly or by providing the cell at this point with a layer of an insulating material to which the spring sticks.

Figure 6:
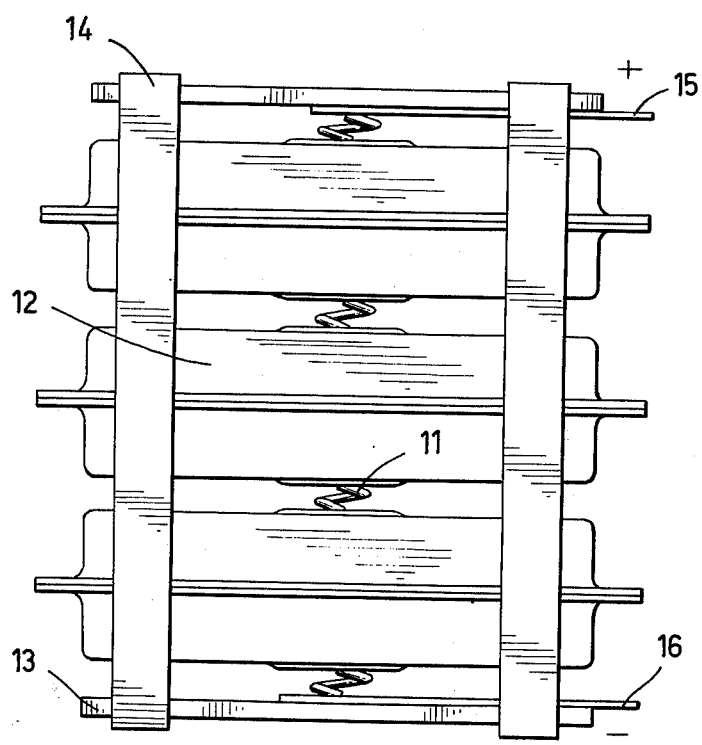
FIG. 6 illustrates a battery comprising three cell units.

FIG. 6 schematically illustrates a battery comprising three cells. The contact elements of the cells connected in series here function at the same time as the positive terminal of one cell and as the negative terminal of an adjacent cell. In practice, the stack of cells is compressed so firmly that there is no air gap between the different parts.

When the above cell units one used, the terminals of the battery and its contact elements as well as the pressure mechanism can also be included in a current-consuming device, whereby battery supply would consist of cell units only. As mentioned above, the handling and, storing of these is very easy. Further, one can immediately see whether a cell has not been used because then the plastic cover is unbroken. This application can be used, e.g., in small clock and meteorological batteries, in batteries of navigation aids and in some batteries used for military purposes.

Figure 7A:
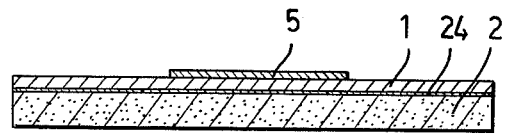
FIGS. 7a and 7b illustrate a positive and a negative electrode element, respectively, which, disposed upon each other and packed in a plastic cover, form a cell unit.

The greatest advantage of the above battery structure is perhaps the fact that these cells can be produced by means of a such conventional plastics vacuum envelope packing machinery that are used, e.g., in the food industry. To illustrate this, the positive electrode element of the cell unit has separately been shown as a simplified embodiment of FIG. 7a, which element comprises the current collector sheet 1, mass tablet 2, and insulating layer 5, and a layer 24 of a protecting paint between the mass tablet 2 and the current collector sheet 1. Preferably said protecting paint is a carbon loaded conductive paint, in which the binder material is very resistant to oxygen, such as chlorosulfonated polyethylene.

Figure 3B:
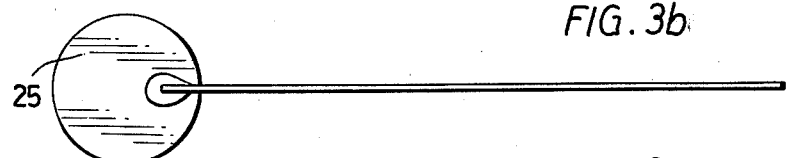
Figure 7B:
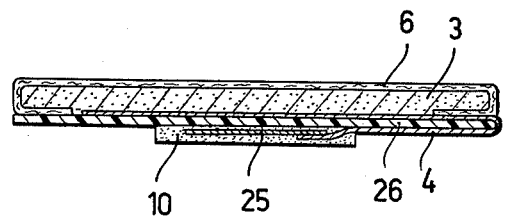

In the embodiment of FIG. 7b the negative electrode element comprises a cake 3 of mainly zinc powder. A separator paper layer 6 is folded around said cake 3 covering its upper surface, its sides and partially the surface underneath. A rigid plastic plate 26 is arranged under said cake 3 and is provided with a central insulating layer 10 on its under side. A current collector according to FIG. 3b is arranged in such a manner that the metal sheet 25 is embedded in the insulating layer 10, whereas the wire 4 is bent around the insulating plate 26 to make a contact with said cake 3.

Figure 8:
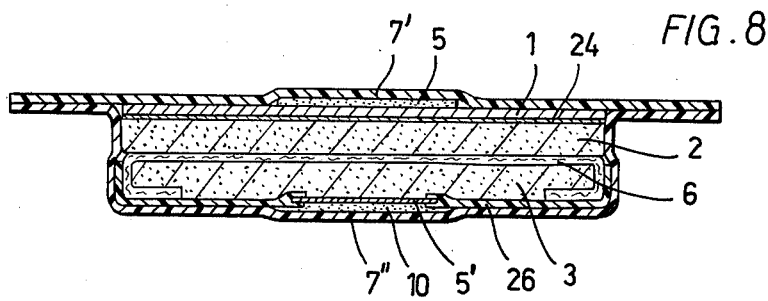
FIG. 8 illustrates the cross-section of a third embodiment of the cell unit according to the invention.

In the embodiment of FIG. 8, the negative electrode is arranged within a cup 26 of insulating material. The current collector plate 5' is molded in a central aperture in the insulating cup 26.

FIG. 9 illustrates the production of cell units by means of a vacuum packing machinery. To the feeding end of the machinery the conveyer belts 19 and 20 carry electrode elements 7b and 7a with the insulating material spots 10 and 5 on the upper side. The elements 7b are disposed at the places of the plastics sheet indicated by the frame, which sheet moves by steps from a roll 21. To facilitate the operation, recesses corresponding to the cells can be formed into this lower plastics sheet by means of a vacuum forming device. At the next stage, the elements 7a are placed upon the elements 7b. The plastics sheet form the roll 22 is heat sealed to the lower plastics sheet along the edges of the element packages in a vacuum chamber 23. The cutting means 30 finally separate the cell units from each other. As an example, it can be mentioned that by means of a standard packing machinery 100 to 200 units corresponding to R25-cells can be produced in a minute.

The above cell units can naturally be applied to other electro-chemical systems than the described alkaline battery by choosing each time current collectors, insulating material, and plastics sheet so that they are resistant to the chemicals used.

What I claim is:

1. An alkaline flat cell battery comprising:
   a. terminal means
   b. at least one flat cell arranged between said terminal means and being provided with a positive and a negative current collector;
   c. battery contact elements in connection with said terminal means
   d. contact areas of insulating material on both sides of each cell and corresponding to each other and being arranged in contact with the current collectors;
   e. an envelope of plastics material, one for each of the cells, surrounding its respective cell to form a sealed unit; and
   f. individual contact elements electrically interconnecting, on the one hand, adjacent cells and, on the other hand, the outermost cells and the battery contact elements, said individual contact elements being formed as metallic spring elements which are resiliently compressible in a direction substantially perpendicular to the contact area of the cell contacted thereby and have at least two point portions arranged to face in substantially opposite directions so as to pierce the envelope and the contact area of the cells to secure the electrical interconnecting of the battery when said terminal means are pressed against said flat cells.

2. An alkaline flat cell battery as claimed in claim 1, further comprising supporting plates essentially covering the whole outside of the positive and the negative electrode layer, respectively.

3. An alkaline flat cell battery as claimed in claim 1, wherein the contact areas comprise a relatively thick plastic layer of chemically inert, water repellent adhesive.

4. An alkaline flat cell battery as claimed in claim 3, where said adhesive is bitumen.

5. An alkaline flat cell battery as claimed in claim 1, wherein said envelope comprises two parts which are heat sealed together in vacuum.

6. An alkaline flat cell battery as claimed in claim 1, wherein said envelope material is laminated and comprises two layers, the inside layer being chemically resistant and heat sealable, and the outside layer being mechanically tough and resistant to oxygen transmission.

7. An alkaline flat cell battery as claimed in claim 1, wherein said spring elements are spiral-shaped, comprise nearly a whole circle, and have a pitch of the order to half its diameter.

8. An alkaline flat cell battery as claimed in claim 1, wherein said spring elements are oval-shaped, comprising one substantial straight portion and two curved point portions.

9. An alkaline flat cell battery as claimed in claim 8, wherein the angle between said curved point portions and the main plane of the element is within the range of 30° to 60°.

10. An alkaline flat cell battery as claimed in claim 1, wherein said spring elements are made of steel wire.

11. An alkaline flat cell battery as claimed in claim 1, further comprising a layer of protecting paint between the positive electrode material and its current collector.

12. An alkaline flat cell battery as claimed in claim 11, wherein said protecting paint is a carbon loaded conductive paint, in which the binder material is very resistant to oxygen.

13. An alkaline flat cell battery as claimed in claim 12, wherein the binder material is chlorosulfonated polyethylene.

14. An alkaline flat cell device comprising:
a. first and second contact elements;
b. a flat cell arranged between said contact elements and provided with a positive current collector and a negative current collector;
c. a first contact area of insulating material on one side of the flat cell and arranged in contact with the positive current collector;
d. a second contact area of insulating material on the opposite side of the flat cell and arranged in contact with the negative current collector in a position corresponding to that of the first contact area on said one side of the cell;
e. an envelope of plastics material surrounding the flat cell to form a sealed unit;
f. a first metallic spring element which is disposed between said one side of the flat cell and the first contact element; and
g. a second metallic spring element which is disposed between said opposite side of the flat cell and the second contact element, each of the first and second metallic spring elements having a point portion arranged to pierce the envelope and one of said contact areas when the contact elements are pressed towards the flat cell thereby to establish electrically-conductive contact between the positive current collector and the first contact element by way of the first spring element and between the negative current collector and the second contact element by way of the second spring element, the first spring element being resiliently compressible in a direction substantially perpendicular to the first contact area and the second spring element being resiliently compressible in a direction substantially perpendicular to the second contact area.

15. An alkaline flat cell device comprising:
a. first and second battery contact elements;
b. a plurality of flat cells arranged substantially in the form of a stack between said contact elements, the stack of flat cells including a first cell at one end of the stack and a second cell at the opposite end of the stack, and the flat cells being sealed within respective envelopes of plastics material and being each provided with a positive current collector and a negative current collector, and with first and second contact areas in corresponding positions on opposite respective sides of the flat cell and arranged in contact respectively with the positive and negative current collectors thereof;
c. a first metallic spring element disposed between said first cell at said one end of the stack and said first battery contact element and having a point portion arranged to pierce the envelope and one of said contact areas of said first cell when the first battery contact element is pressed towards said first cell, thereby to establish electrically-conductive contact between said first battery contact element and one of said current collectors of said first cell, and being resiliently compressible in a direction substantially perpendicular to said one contact area of said first cell;
d. a second metallic spring element disposed between said second cell at said opposite end of the stack and said second battery contact element and having a point portion arranged to pierce the envelope and one of said contact areas of said second cell when the second battery contact element is pressed towards said second cell, thereby to establish electrically-conductive contact between said second battery contact element and one of said current collectors of said second cell, and being resiliently compressible in a direction substantially perpendicular to said one contact area of said second cell; and
e. at least one further metallic spring element each disposed between the two cells of a pair of adjacent cells in the stack and having a first point portion arranged to pierce the envelope of one of said contact areas of one cell of the pair and a second point portion arranged to face substantially oppositely from the first point portion to pierce the envelope and one of said contact areas of the other cell of the pair when the pair of flat cells are pressed together, thereby to establish electrically-conductive contact between one current collector of said one cell of the pair and one current collector of said other cell of the pair, and being resiliently compressible in a direction substantially perpendicular to said one contact area of said one cell of the pair and said one contact area of said other cell of the pair.

16. An alkaline flat cell device as claimed in claim 14, further comprising means urging the first and second contact elements towards the flat cell.

17. An alkaline flat cell device as claimed in claim 15, further comprising means urging said first and second battery contact elements together, and compressing said stack of flat cells therebetween.

* * * * *